United States Patent [19]

Donohue

[11] 4,305,104
[45] Dec. 8, 1981

[54] INFORMATION STORAGE POSITION CONTROL APPARATUS

[75] Inventor: James P. Donohue, Fairborn, Ohio

[73] Assignee: NCR Corporation, Dayton, Ohio

[21] Appl. No.: 125,728

[22] Filed: Feb. 28, 1980

[51] Int. Cl.³ .................. G11B 21/08; G11B 21/06
[52] U.S. Cl. .................................. 360/106; 360/97
[58] Field of Search ............. 360/74.2, 97, 106, 105

[56] References Cited

U.S. PATENT DOCUMENTS

| | | | |
|---|---|---|---|
| 2,994,856 | 8/1961 | Dickinson | 360/106 |
| 3,643,036 | 2/1972 | Takashima et al. | 360/106 |
| 3,749,827 | 7/1973 | Kinjo et al. | 360/106 |
| 3,921,216 | 11/1975 | Wada | 360/106 |
| 3,922,718 | 11/1975 | Halfhill et al. | 360/78 |
| 4,034,413 | 7/1977 | Tahara | 360/106 |
| 4,080,638 | 3/1978 | Platt | 360/105 |

Primary Examiner—Stuart N. Hecker
Attorney, Agent, or Firm—J. T. Cavender; Albert L. Sessler, Jr.

[57] ABSTRACT

A system is disclosed for obtaining read/write head positioning movement and control for a storage disc drive. The rotational energy source for the disc is also utilized for the additional task of indexing the read/write head assembly, thereby eliminating need for a second drive source and associated circuitry. Solenoid actuating means are employed to engage one of two driven rollers with a track position wheel to cause said wheel to rotate in one of two opposite directions. This rotational movement is converted into indexing movement of the read/write head assembly.

18 Claims, 7 Drawing Figures (IN)

(OUT)

ed with
reference to the drawings which accompany and form a
part of this specification.

INFORMATION STORAGE POSITION CONTROL APPARATUS

BACKGROUND OF THE INVENTION

A need exists at the present time for a simple low-cost method of controlling the position of the read/write heads in information storage systems. A number of different disc drive systems are available in the market which incorporate two prime movement sources, of which one supplies rotational energy to the storage disc, and the other supplies energy and control for movement and positioning of the read/write head, which are required for selection of storage locations on the disc.

Examples of prior art disc drive head control systems are shown in U.S. Pat. Nos. 3,922,718 and 4,034,413.

The present invention eliminates the need for a separate prime movement source for movement and positioning of the read/write head, and utilizes the storage disc prime movement source for this purpose.

SUMMARY OF THE INVENTION

The present invention relates to apparatus for storage and retrieval of information utilizing a storage medium. More particularly, the invention relates to a positioning control system for the transducer head assembly forming part of such an apparatus.

According to one embodiment of the invention, a storage medium control apparatus comprises storage medium drive means; a carriage adapted for bi-directional radial movement with respect to the storage medium, said carriage including a transducing unit positioned thereon; a rotary carriage driving element; coupling means coupling the rotary carriage driving element to the carriage and converting the rotary movement of the rotary carriage driving element to linear movement of the carriage; first and second drive means selectively engageable with said rotary element to drive it in a first or second direction of rotation; means for causing said first and second drive means to be driven by the storage medium drive means; and selecting means for selecting one or the other of said first and second drive means and engaging the selected drive means with the rotary element to drive said rotary element in the selected direction, and thereby drive the carriage in a selected direction.

It is accordingly an object of the present invention to provide a low-cost, efficient and accurate means for controlling the movement and positioning of the read/write heads in a disc drive system.

A further object is to provide means for controlling the movement and positioning of read/write heads in a disc drive system which utilizes the disc drive power source for head movement and positioning, rather than requiring a separate source for this purpose.

Another object is to provide means for controlling the movement and positioning of read/write heads in disc drive systems, including means for moving one of two driven rollers into engagement with a track position wheel to cause said wheel to rotate in one of two opposite directions, said rotational movement being converted into linear indexing movement of the read/write head assembly.

With these and other objects, which will become apparent from the following description, in view, the invention includes certain novel features of construction and combinations of parts, a preferred form or embodiment of which is hereinafter described with reference to the drawings which accompany and form a part of this specification.

DESCRIPTION OF THE PREFERRED EMBODIMENT

Figure 1:
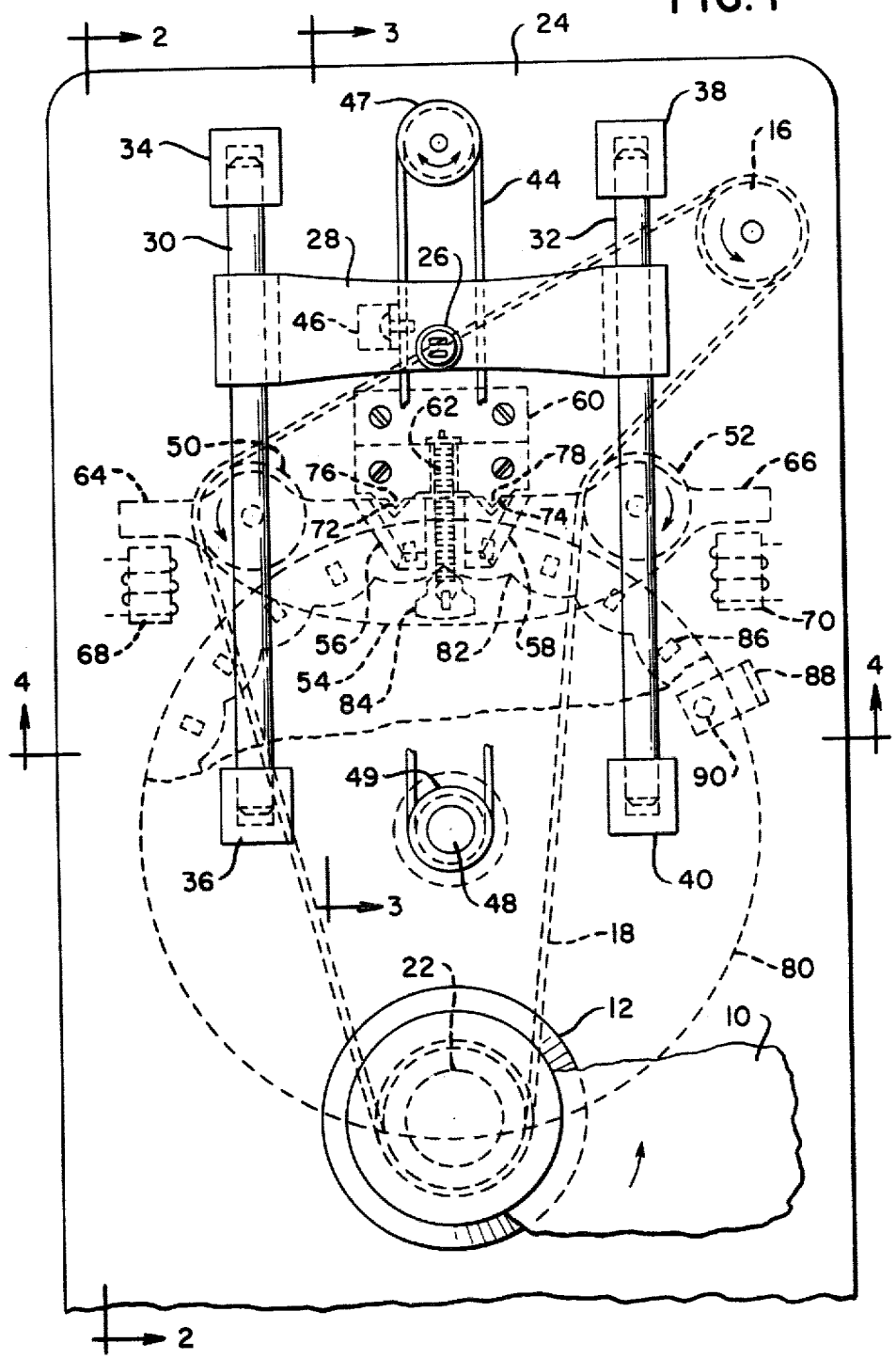
FIG. 1 is a plan view of the apparatus.

As shown in the drawings, a disc 10 which may be of magnetic, optical or other suitable type utilized for storage of information, is mounted on a capstan 12. The disc 10 is continuously driven, typically at a speed of about 300 rpm, during operation, by a drive motor 14, acting through a pulley 16, an elastic-type belt drive 18, a pulley 20 and a shaft 22 to which the capstan 12 is secured, said shaft being journaled in a base member 24.

Figure 2:
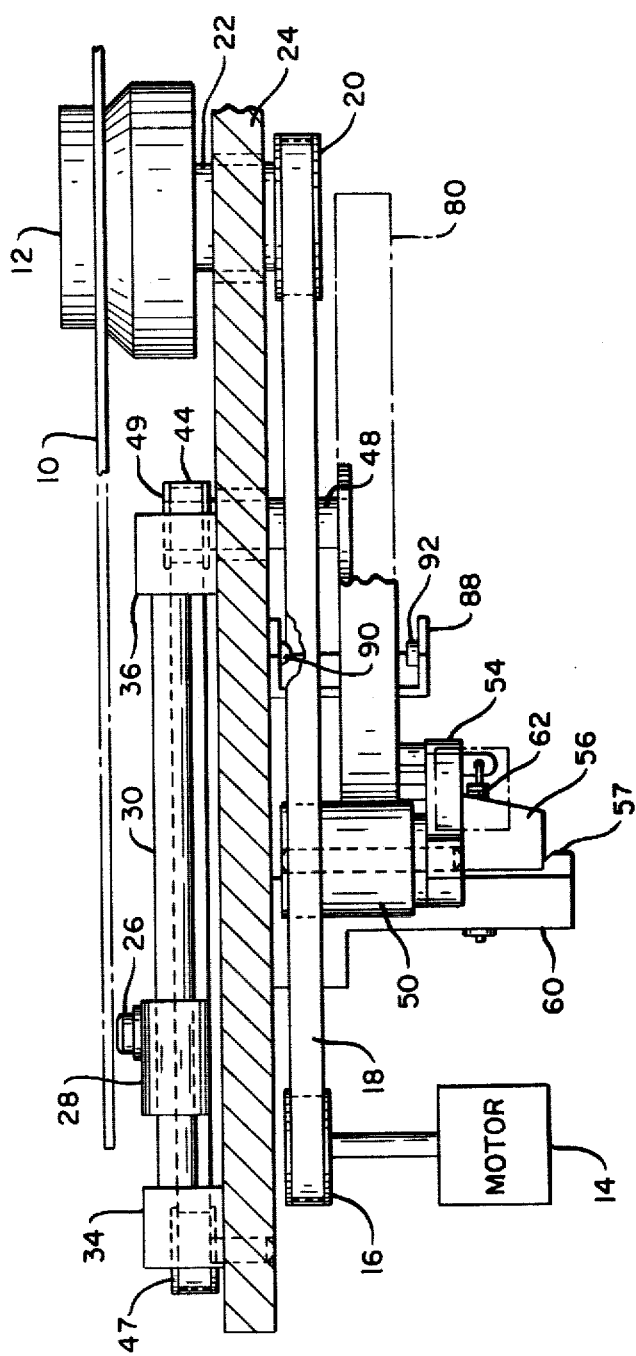
FIG. 2 is a sectional view taken on line 2—2 of FIG. 1.
Figure 3:
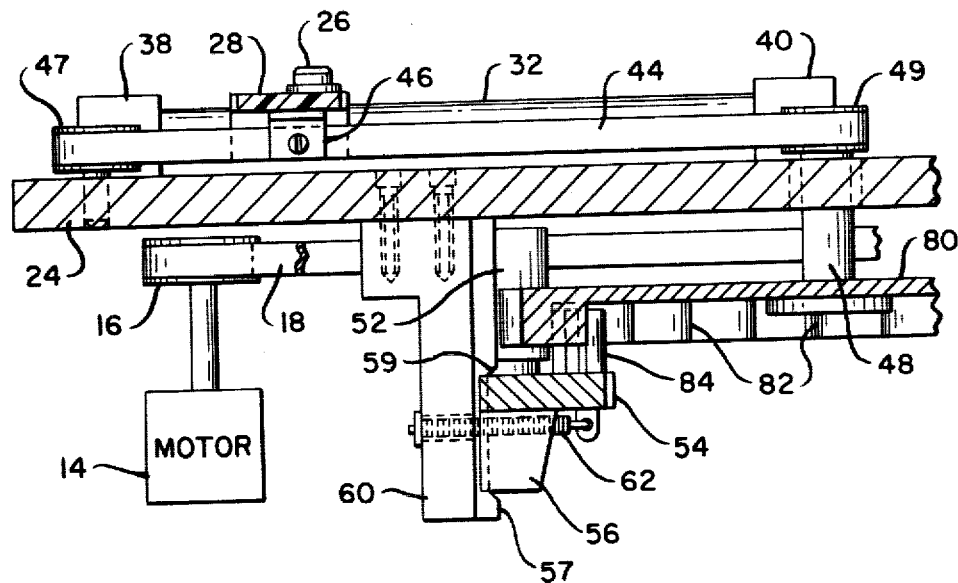
FIG. 3 is a sectional view taken on line 3—3 of FIG. 1.
Figure 4:
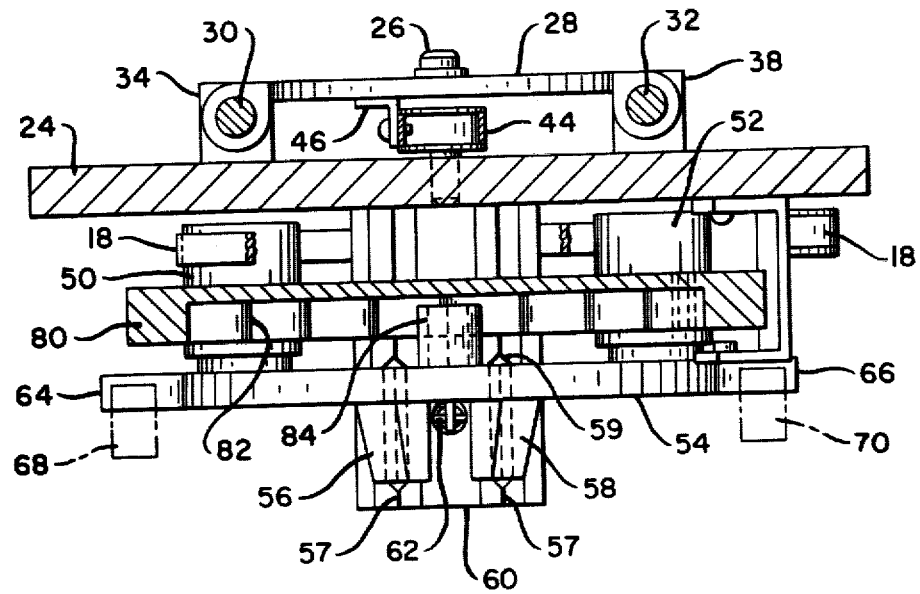
FIG. 4 is a sectional view taken on line 4—4 of FIG. 1.

As may best be seen in FIG. 2, at least one transducer head 26 is positioned in operative relation to one surface of the disc 10 for the purpose of reading, or reading and writing, information on said disc, depending upon the type of storage medium involved. For example, in one type of optical storage means, the data is permanently stored on the disc, and the transducer head 26, in such case, would perform only a reading function. On the other hand, in many types of magnetic rotating storage media, data can be stored on the medium, read therefrom and erased therefrom when desired, in which case the transducer head 26 would be capable of performing both a reading and a writing function, as well as an erasing function.

The transducer head 26 is secured to a carriage 28 which is mounted for reciprocating movement radially of the disc 10 on a pair of rails 30, 32 secured by end members 34, 36, 38, 40 to the base member 24.

Movement of the carriage 28 is accomplished through the medium of a belt 44 which is pinned to a bracket 46 on the carriage 28 and which extends around an idler 47 mounted on the base member 24 and a pulley 49 fixed to a shaft 48 which is journaled in the base member 24 and is secured to a track position wheel 80 located on the other side of the base member 24 from the carriage 28.

Two rollers 50 and 52 are continuously driven in opposite directions by the belt 18 and are rotatably mounted on a dual lever arm 54 having two protrusions 56, 58 which ride on a lip 57 of a fulcrum element 60 secured to the base member 24. Said fulcrum element 60 also has an upper lip 59 which engages the upper surface of the lever arm 54. A spring 62 extending between the lever arm 54 and the fulcrum element 60 urges said lever arm 54 into engagement with the fulcrum element 60 and prevents the protrusions 56, 58 of the lever arm 54 from slipping off the lip 57. The lever arm includes at its ends extensions 64, 66, each of which is adjacent to one of the rollers 50, 52 and is positioned to coact with one of a pair of solenoids 68, 70.

Figure 5:
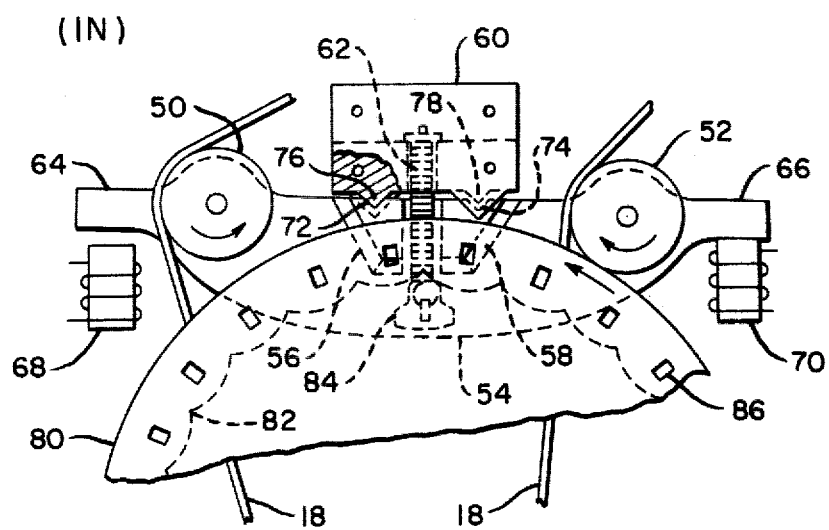
FIGS. 5 and 6 are fragmentary plan views of the apparatus showing details of the solenoid-operated disc drive mechanism when operating to drive the disc in a first and a second direction, respectively.
Figure 6:
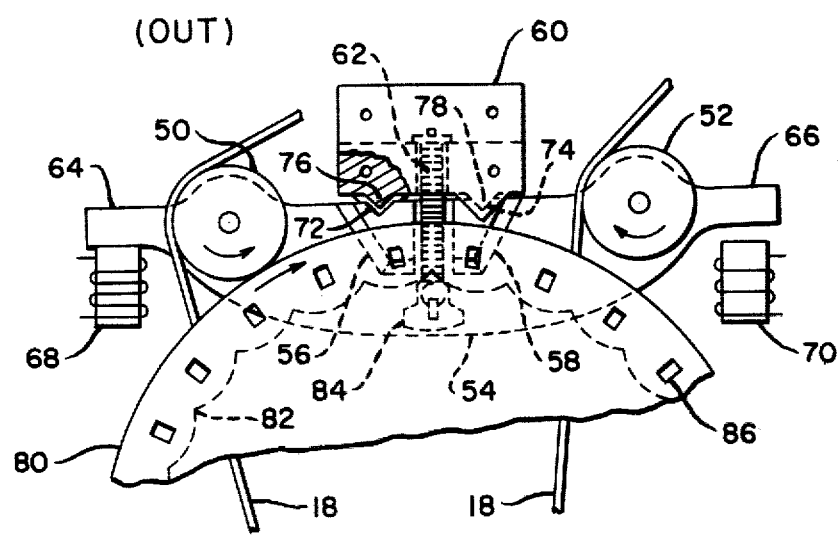

As best seen in FIGS. 5 and 6, notches 72, 74 on that edge of the lever arm 54 which bears on the fulcrum element 60 cooperate with projections 76, 78 on the fulcrum element 60 to provide fulcrum points for said lever arm. When the solenoid 68 is energized, as shown in FIG. 6, the extension 64 is drawn into engagement with it, causing the lever arm 54 to pivot on the projection 78, bringing the roller 50 into driving engagement with the periphery of the track position wheel 80, for imparting rotary movement in a clockwise direction, as viewed in FIG. 6, to said wheel. This, in turn, acts through the shaft 48, the pulley 49, the belt 44 and the carriage 28, to move the transducer head 26 outwardly with respect to the storage disc 10.

FIG. 5 shows the position assumed by the various drive elements when solenoid 70, rather than solenoid 68, is energized, resulting in movement of the transducer head 26 inwardly with respect to the storage disc 10.

The track position wheel 80 is internally cut away to provide a plurality of notches 82 in a generally scalloped circumferential configuration. These notches cooperate with an aligning member 84 secured to the lever arm 54 to provide a centering action so that the final location of each incremental movement of the track position wheel 80 can be precisely determined, thus enabling a high degree of accuracy to be achieved in positioning the head 26 with respect to a desired track on the disc 10.

As shown in FIG. 1, a plurality of slots 86 are disposed in circumferential configuration on the wheel 80, and cooperate with a position sensing transducer 88, including a light source 90 and a light detector 92, to provide means for determining the position and amount of movement of the wheel 80 during operation of the head position control means.

Figure 7:
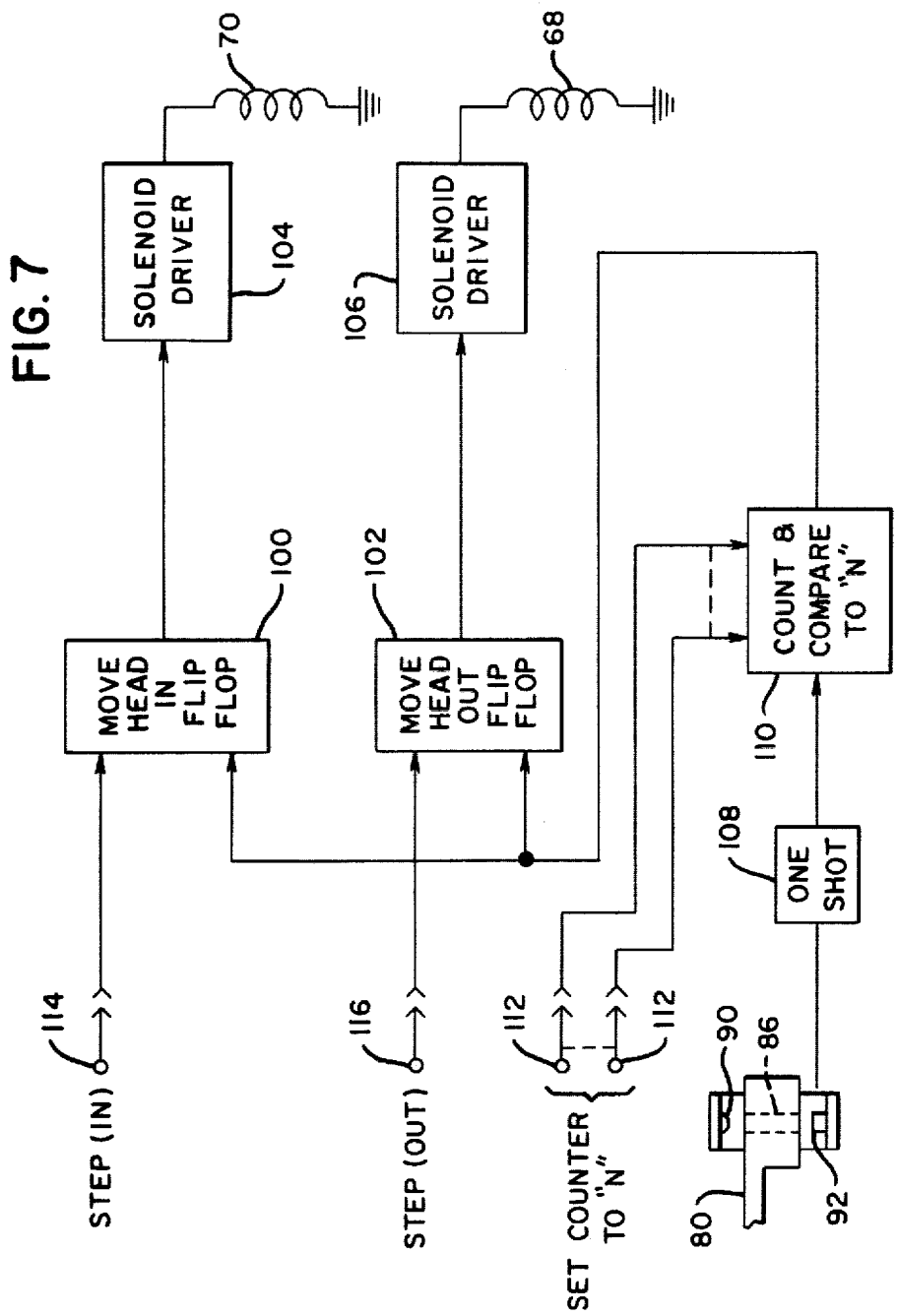
FIG. 7 is a schematic diagram showing control circuitry for the apparatus.

Shown in FIG. 7 is one circuit arrangement which may be employed for driving the apparatus of the present invention. It will be seen that this circuitry includes first and second flip-flops 100 and 102, solenoid driver circuits 104 and 106 coupled to said flip-flops, the output of each of said solenoid driver circuits being coupled in turn to one of the solenoids 70 and 68, respectively. Also included in the circuitry of FIG. 7 is a one-shot 108, the input of which is coupled to the light detector 92, and the output of which is coupled to a circuit element 110, which includes a presettable counter and a comparator. The output of the circuit element 110 is coupled to the reset terminal of each of the two flip-flops 100 and 102. A set of inputs to the circuit element 110 is provided from the terminals 112, which are connected to the appropriate terminals in a disc controller which will normally be associated with the device of the present invention. A set of signals are applied to the terminals 112 to cause the counter of the circuit element 110 to be set to a particular count, which represents the number of tracks in either direction which the transducer head 26 is to be moved. The controller is assumed to be of the type which will "remember" the present track position of the transducer head, and will determine the number of tracks in either direction past which the transducer is to be moved, in order to arrive at the new desired track on the disc 10.

Also included in the circuit of FIG. 7 are two additional terminals 114 and 116. A "step in" signal is applied to the terminal 114, in order to initiate a movement of the transducer in an inward direction toward the center of the storage disc 10. A "step out" signal is to be applied to the terminal 116 in order to initiate a movement of the transducer head in an outward direction toward the periphery of the storage disc 10.

Functioning of the disc drive apparatus of the present invention will now be described. When it is desired to cause the transducer head 26 to move inwardly, toward the center of the storage disc, the number of steps for such movement, corresponding to the number of tracks on the disc to be traversed, is determined, and a signal corresponding to that number is applied from the controller over terminals 112 to the count and compare circuit element 110. A signal is also applied to the terminal 114 to cause initiation of movement of the transducer in an inward direction. The signal on the terminal 114 causes the flip-flop 100 to be set, and said flip-flop remains in a set condition for the duration of the time required to cause the solenoid 70 to maintain the roller 52 in contact with the drive wheel 80 for inward movement of the transducer head 26 in a manner previously described.

The extent of such movement is determined by sensing of the slots 86 in the drive wheel as they pass the position of the light detector 92. Each pulse generated from the passage of such a pulse is shaped by the one-shot 108 and applied to the count and compare circuit 110. When the total number of pulses sensed by the light detector 92 is equal to the number previously set in the count and compare circuit 110 from the terminal 112, an output pulse is generated by the circuit element 110 and is applied to the reset terminal of the two flip-flops 100 and 102, thereby resetting the flip-flop (flip-flop 100 in the described instance) which has been set. Resetting of the flip-flop 100 teminates the current to the solenoid driver 104 and thus deenergizes the solenoid 70, causing the roller 52 to be moved away from the periphery of the wheel 80, and causing counterclockwise movement of the wheel, and thereby inward movement of the transducer head 26 to cease. Centering action under control of the notch 82 on the wheel 80 and the cooperating aligning element 84 causes the drive wheel to be stopped in a position which precisely and correctly locates the transducer head 26 with respect to that track on the disc 10 which it is now to sense or write upon.

It will be seen that the same type of operation takes place for stepping in an outward direction, except that the signal is applied to the terminal 116, rather than the terminal 114, and the track position wheel 80 is caused to rotate in a clockwise direction.

The various circuit elements 100, 102, 104, 106, 108 and 110 may be purchased as integrated circuit units. The flip-flops 100 and 102 may be of type CD4096B, manufactured by RCA. The solenoid drivers 104 and 106 may be of type S75V03, manufactured by Siliconix. The one-shot 108 may be of type CD4047B, manufactured by RCA. The count and compare circuit element 110 may be of type CD40103B, manufactured by RCA.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

I claim:

1. Storage medium control apparatus comprising:
   storage medium drive means;

a carriage adapted for bi-directional radial movement with respect to the storage medium, said carriage including a transducing unit positioned thereon;

a rotary carriage driving element;

coupling means coupling the rotary carriage driving element to the carriage and converting the rotary movement of the rotary carriage driving element to linear movement of the carriage;

first and second drive means selectively engageable with said rotary element to drive it in a first or second direction of rotation;

means for causing said first and second drive means to be driven by the storage medium drive means; and selecting means for selecting one or the other of said first and second drive means and engaging the selected drive means with the rotary element to drive said rotary element in the selected direction, and thereby drive the carriage in a selected direction.

2. The storage medium control apparatus of claim 1, in which the rotary element includes fine positioning means to precisely determine the positioning of said rotary element after movement and thereby determine the fine positioning of the carriage.

3. The storage medium control apparatus of claim 1, also including a plurality of mounting rails for slidably mounting the carriage and defining its path of movement.

4. The storage medium control apparatus of claim 1, in which the selecting means comprises a pair of solenoids.

5. The storage medium control apparatus of claim 1, in which the rotary element includes position indicating means whereby the movement and position of the rotary element may be determined.

6. The storage medium control apparatus of claim 5, in which the position indicating means of the rotary element comprises slots located along the periphery of said element cooperating with sensing means positioned to detect the passage of said slots.

7. The storage medium control apparatus of claim 1, in which the first and second drive means comprise rollers engageable with the periphery of the rotary element, said rollers both being driven by the storage medium drive means and being mounted on a rockable support, the position of which is controlled by said selecting means.

8. The storage medium control apparatus of claim 7, in which the rockable support is pivoted on one of two fixed fulcrums when moved to one of two positions by said selecting means.

9. The storage medium control apparatus of claim 1, in which the transducing unit is centrally positioned on the carriage for coaction with the storage medium.

10. The storage medium control apparatus of claim 1, in which the coupling means comprises a belt which is fixed to a hub of the rotary element, is supported by an idler pulley, and is also fixed to a clamp secured to the carriage.

11. The storage medium control apparatus of claim 1, also including control means capable of operating one of said selecting means to cause one of the drive means to engage the rotary element for imparting movement thereto of a selected amount and direction.

12. The storage medium control apparatus of claim 11, in which said control means includes initiating means for initiating operation of a selected one of said selecting means to commence movement of the carriage with respect to the storage medium, and includes counting and comparison means for terminating operation of said selecting means when the transducing unit has moved a desired distance.

13. Rotating disc memory apparatus comprising:

means for rotating the disc;

a carriage adapted for bi-directional radial movement with respect to the disc, said carriage including a transducing unit positioned thereon;

rail means for supporting said carriage for constrained bi-directional radial movement;

rotatable track position wheel means for controlling the position of said carriage;

support means for the disc;

belt means secured to said wheel means and said carriage for linearly shifting said carriage in response to rotary movement of said wheel means;

first and second solenoid means for controlling the movement of said carriage;

first and second lever means pivotally mounted on said support means, each having mounted thereon a means for driving said wheel means in one of two directions of rotation, and each also including means coacting with one of said solenoid means for coupling the respective drive means with said wheel means to cause said wheel means to be driven in a selected direction;

fulcrum means mounted on said support means for said first and second lever means;

means coupling the disc rotating means with the two drive means for driving one of said drive means in a first direction and the other drive means in a second direction;

a plurality of position indicating means on the wheel means;

detector means positioned to detect said indicating means to provide information concerning the position and movement of the wheel means; and control means capable of selectively energizing one or the other of said solenoid means to cause one of the drive means to be coupled to the wheel means for imparting movement thereto of a selected amount and direction, said detector means coupled to said control means to provide information concerning the extent of movement of said wheel means.

14. Rotating disc memory apparatus comprising:

an information storage disc;

means for rotating said disc;

support means for the rotating means;

a data transducing head cooperating with the disc;

a carriage adapted for bi-directional radial movement with respect to the disc, said carriage having said transducing head positioned thereon;

rail means for supporting said carriage for constrained bi-directional radial movement;

rotatable track position wheel means for controlling the position of said carriage;

belt means secured to said wheel means and said carriage for linearly shifting said carriage in response to rotary movement of said wheel means;

first and second solenoid means for controlling the movement of said carriage;

first and second lever means pivotally mounted on said support means, each having mounted thereon a means for driving said wheel means in one of two directions of rotation, and each also including means coacting with one of said solenoid means for coupling the respective drive means with said wheel means to cause said wheel means to be driven in a selected direction;

fulcrum means mounted on said support means for said first and second lever means;

means coupling the disc rotating means with the two drive means for driving one of said drive means in a first direction and the other drive means in a second direction;

a plurality of position indicating means on the wheel means;

detector means positioned to detect said indicating means to provide information concerning the position and movement of the wheel means; and control means capable of selectively energizing one or the other of said solenoid means to cause one of the drive means to be coupled to the wheel means for imparting movement thereto of a selected amount and direction, said detector means coupled to said control means to provide information concerning the extent of movement of said wheel means.

15. The rotating disc memory apparatus of claim 14 in which said control means includes initiating means for initiating the energization of a selected one of said solenoid means to commence movement of the carriage with respect to the disc and also includes counting and comparison means for terminating energization of said selected solenoid when the detector means has detected a number of position indicating means corresponding to a desired number of increments of movement of the transducer head.

16. Rotating disc memory apparatus comprising:
an information storage disc;
means for rotating said disc;
a data transducing head cooperating with the disc;
a carriage adapted for bi-directional radial movement with respect to the disc, said carriage having said transducing head positioned thereon;
a rotary carriage driving element;
coupling means coupling the rotary carriage driving element to the carriage and converting the rotary movement of the rotary element to linear movement of the carriage;
first and second drive means selectively engageable with said rotary element to drive it in a first or second direction of rotation;
means for causing said first and second drive means to be driven by the disc rotating means; and
selecting means for selecting one or the other of said driving means and engaging the selected means with the rotary element to drive said rotary element in the selected direction, and thereby drive the carriage in a selected direction.

17. Rotating disc memory apparatus comprising:
an information storage disc;
means for rotating said disc;
a data transducing head cooperating with the disc;
a carriage adapted for bi-directional radial movement with respect to the disc, said carriage having said transducing head positioned thereon;
a rotary carriage driving element;
coupling means coupling the rotary carriage driving element to the carriage and converting the rotary movement of the rotary element to linear movement of the carriage;
first and second drive means selectively engageable with said rotary element to drive it in a first or second direction of rotation;
means for causing said first and second drive means to be driven by the disc rotating means;
selecting means for selecting one or the other of said drive means and engaging the selected means with the rotary element to drive said rotary element in the selected direction, and thereby drive the carriage in a selected direction; and
control means capable of operating one of said selecting means to cause one of the drive means to be coupled to the rotary carriage driving element for imparting movement thereto of a selected amount and direction.

18. The rotating disc memory apparatus of claim 17 in which said control means includes initiating means for initiating operation of a selected one of said selecting means to commence movement of the carriage with respect to the disc and also includes counting and comparison means for terminating operation of said selecting means when the transducer head has moved a desired distance.

* * * * *